(12) United States Patent
Groh et al.

(10) Patent No.: US 10,292,001 B2
(45) Date of Patent: May 14, 2019

(54) IN-VEHICLE, MULTI-DIMENSIONAL, AUDIO-RENDERING SYSTEM AND METHOD

(71) Applicant: Ford Global Technologies, LLC, Dearborn, MI (US)

(72) Inventors: Alexander Groh, Detroit, MI (US); Benjamin Vondersaar, Detroit, MI (US); Edgar Nunez, Detroit, MI (US); Prabhanjan Kadepurkar, Ann Arbor, MI (US); Matthew Dage, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/427,744

(22) Filed: Feb. 8, 2017

(65) Prior Publication Data

US 2018/0227695 A1     Aug. 9, 2018

(51) Int. Cl.
| | |
|---|---|
| H04R 5/02 | (2006.01) |
| H04S 7/00 | (2006.01) |
| H04S 3/02 | (2006.01) |
| H04R 5/04 | (2006.01) |
| G06F 3/0481 | (2013.01) |
| H04R 3/12 | (2006.01) |

(52) U.S. Cl.
CPC .............. *H04S 7/302* (2013.01); *H04R 5/02* (2013.01); *H04R 5/04* (2013.01); *H04S 3/02* (2013.01); *G06F 3/0481* (2013.01); *H04R 3/12* (2013.01); *H04R 2420/03* (2013.01); *H04R 2460/07* (2013.01); *H04R 2499/13* (2013.01); *H04S 2400/11* (2013.01); *H04S 2400/13* (2013.01); *H04S 2420/01* (2013.01)

(58) Field of Classification Search
USPC ....... 381/19, 26, 27, 17, 300, 302, 303, 307, 381/310, 311, 365, 389
See application file for complete search history.

(56) References Cited

U.S. PATENT DOCUMENTS

| | | | |
|---|---|---|---|
| 5,822,438 A | 10/1998 | Sekine | |
| 6,937,165 B2* | 8/2005 | Rogers | G08G 1/167 340/961 |
| 8,996,296 B2* | 3/2015 | Xiang | G01C 21/3629 701/408 |

(Continued)

FOREIGN PATENT DOCUMENTS

| | | |
|---|---|---|
| CN | 104270700 A | 1/2015 |
| EP | 2814027 | 8/2016 |

(Continued)

*Primary Examiner* — Yosef K Laekemariam
(74) *Attorney, Agent, or Firm* — David R. Stevens; Stevens Law Group

(57) ABSTRACT

A method is disclosed for issuing audio alerts within the cabin of a vehicle. The method may include detecting a condition programmatically assigned an audio alert and a virtual source for the audio alert. The method may further include determining, by the computer system based on the virtual source, a gain value for each speaker of a plurality of speakers carried in fix positions onboard the vehicle. Once the gain value for each speaker of the plurality of speak is known, the audio alert may be projected by each speaker of the plurality of speakers according to the gain value determined therefor.

20 Claims, 7 Drawing Sheets

(56) References Cited

U.S. PATENT DOCUMENTS

| | | |
|---|---|---|
| 9,197,979 B2 * | 11/2015 | Lemieux ................ H04S 3/002 |
| 2006/0045295 A1 | 3/2006 | Kim |
| 2013/0158856 A1 | 6/2013 | Xiang |
| 2014/0334637 A1 | 11/2014 | Oswald |
| 2015/0117650 A1 | 4/2015 | Jo |
| 2016/0080884 A1 | 3/2016 | Song |

FOREIGN PATENT DOCUMENTS

| | | |
|---|---|---|
| GB | 2532034 A | 5/2016 |
| WO | WO 2014/032681 | 3/2014 |
| WO | WO 2016/109065 | 7/2016 |
| WO | WO 2017/007665 | 1/2017 |

* cited by examiner

IN-VEHICLE, MULTI-DIMENSIONAL, AUDIO-RENDERING SYSTEM AND METHOD

BACKGROUND

Field of the Invention

This invention relates to vehicular systems and more particularly to systems and methods for object-oriented, multi-dimensional audio rendering on low cost embedded platforms using vector based amplitude panning (VBAP).

Background of the Invention

Sound is a mechanism through which a vehicle may communicate with a driver or other occupant thereof. In general, by improving the sounds issued by a vehicle, communication between the vehicle and any occupant thereof may be improved. Accordingly, what is needed is a system and method for improving the sounds issued by a vehicle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
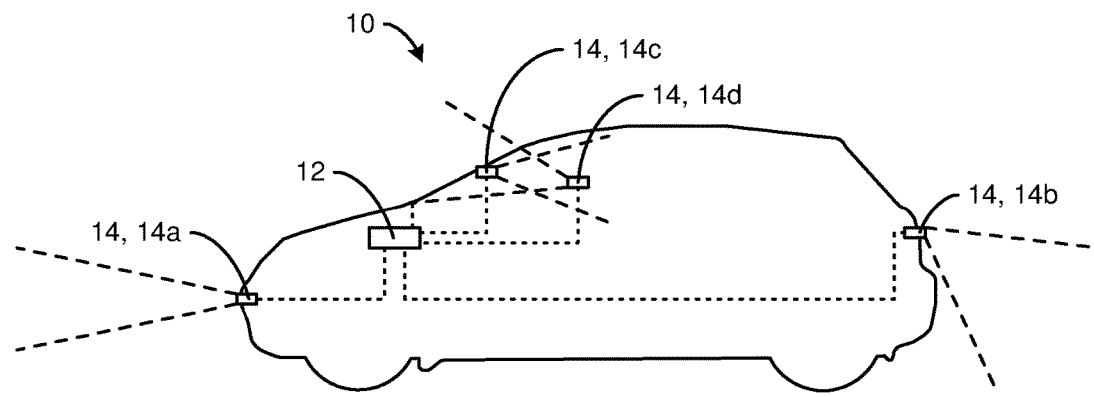
FIG. 1 is a schematic diagram illustrating a vehicle carrying on-board a system for multi-dimensional audio rendering in accordance with the present invention wherein the system is configured to monitor and/or utilize the outputs of various sensors carried on-board the vehicle.

Referring to FIG. 1, in selected embodiments, a vehicle 10 in accordance with the present invention may comprise a computerized system 12 and a plurality of sensors 14. A system 12 may use the outputs of one or more such sensors 14 to determine how best to control various functions or operations of the corresponding vehicle 10. The sensors 14 included within a vehicle 10 may monitor conditions on-board the vehicle 10 or conditions off-board the vehicle 10 (e.g., in the environment surrounding the vehicle 10).

The sensors 14 carried on-board a vehicle 10 may take any suitable form. For example, one or more sensors 14 may comprise forward-facing sensors 14a (e.g., cameras, lidar devices, radar devices, ultrasonic transducers, or the like directed to an area ahead of a vehicle 10), rearward-facing sensors 14b (e.g., back-up cameras or lidar devices, radar devices, ultrasonic transducers, or the like directed to an area behind a vehicle 10), side view sensors (e.g., cameras, lidar devices, radar devices, ultrasonic transducers, or the like directed to an area to a side of a vehicle 10), occupant sensors 14c (e.g., cameras directed toward or capturing images of one or more occupants of a vehicle 10), point-of-view sensors 14d (e.g., cameras, lidar devices, radar devices, or the like capturing an occupant's point of view of and/or through a windshield or other window), accelerometers, gyroscopes, speedometers, thermometers, drive train sensors (e.g., devices for sensing RPM of an engine, wheel slippage, or the like), global positioning system (GPS) devices, proximity sensors, seatbelt sensors, door-position sensors, or the like, or a combination or sub-combination thereof.

In certain embodiments, a system 12 in accordance with the present invention may control one or more core functions of a vehicle 10 (i.e., functions that are fundamental to the driving of the vehicle 10). For example, a system 12 may autonomously or semi-autonomously control the steering and/or speed of a vehicle 10. Thus, a system 12 may control a collection of components, linkages, actuators, or the like that affect the course taken by the vehicle 10, throttle setting on an engine, braking, or the like or a combination or sub-combination thereof.

Additionally, a system 12 may control one or more peripheral functions of a vehicle 10 (i.e., functions that are not fundamental to the driving of the vehicle 10). For example, a system 12 may control which, when, and how audio alerts are issued, the position of one or more seats within a vehicle 10, a climate control system, media settings (e.g., radio stations, television stations, or the like to which a vehicle 10 is tuned), tint of one or more windows, or the like or a combination or sub-combination thereof.

In selected embodiments, information received, collected, or generated by a system 12 (or portions of a system 12) on-board a vehicle 10 may be communicated to some hardware located off-board the vehicle 10. For example, information received, collected, or generated by a system 12 corresponding to a vehicle 10 may be passed through a communication system to a remote computing device. Accordingly, information received, collected, or generated by a system 12 corresponding to a vehicle 10 may be accessed by one or more computers off-board the vehicle 10.

Figure 2:
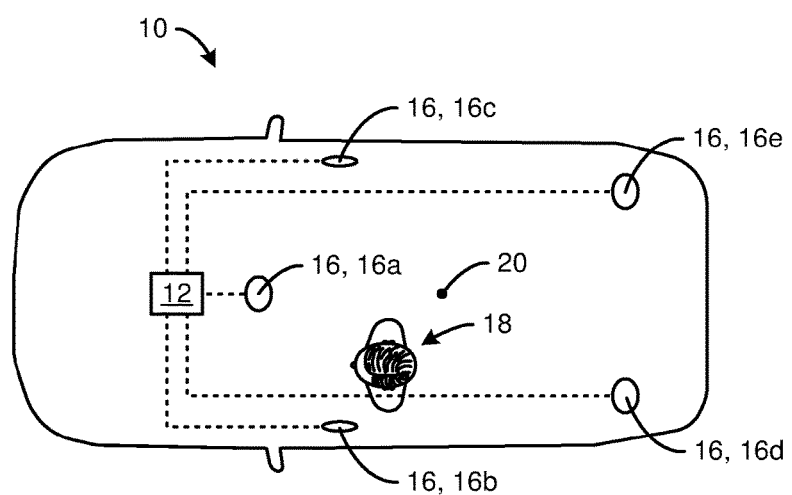
FIG. 2 is a schematic diagram illustrating a vehicle carrying on-board a system for multi-dimensional audio rendering in accordance with the present invention wherein the system is configured to deliver different channel outputs to different speakers carried in fixed locations on-board the vehicle.

Referring to FIG. 2, a vehicle 10 may include a plurality of speakers 16. Each such speaker 16 may be or comprise an electroacoustic transducer that converts an electrical audio signal issued or generated by a system 12 into sound waves that may travel to and be sensed by one or more occupants of a vehicle 10. In selected embodiments, a vehicle 10 may provide feedback or otherwise communicate with a driver or other occupant via one or more sounds issued by one or more such speakers 16.

In certain embodiments, different speakers 16 may be located in different positions within a vehicle 10. The speakers 16 may be distributed in the vehicle 10 so as to be noncollinear (e.g., so that they all do not fall on a single straight line). For example, a vehicle 10 may include one or more front speakers 16*a*, one or more side speakers 16*b*, 16*c* (e.g., a left-side speaker 16*b* and a right-side speaker 16*c*), one or more rear speakers 16*d*, 16*e* (e.g., a left-rear speaker 16*d* and a right-rear speaker 16*e*), one or more roof speakers 16, one or more floor speakers 16, or the like or a combination or sub-combination thereof. The speakers 16 carried on-board a vehicle 10 may be located a different heights. For example, one or more front and/or rear speakers 16*a*, 16*d*, 16*e* may be located higher within the vehicle 10 than one or more side speakers 16*b*, 16*c*.

For any given model of vehicle 10, the spatial relationship between a head of a driver 18 (e.g. an expected or predicted location for the head of the driver) and the various speakers 16 of a vehicle 10 may be known in advance with reasonable precision. Alternatively, or in addition thereto, the spatial relationship between a center point 20 within a cabin of the vehicle 10 and the various speakers 16 may be known in advance. Accordingly, a system 12 may control the sound issuing from one or more speakers 16 in order to control how that sound is perceived by the driver 18, perceived at the center point 20, or perceived at some other location with the cabin of the vehicle 10.

Figure 3:
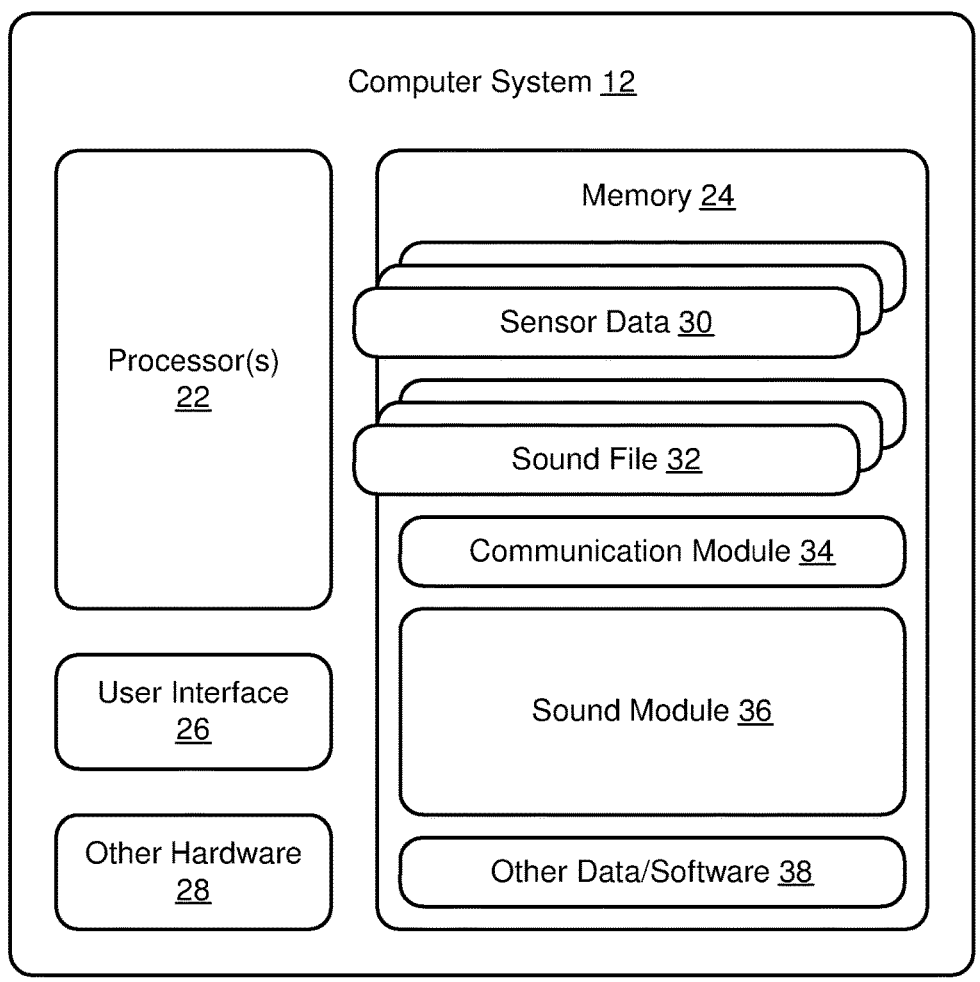
FIG. 3 is a schematic block diagram illustrating one embodiment of a system for object-oriented, multi-dimensional audio rendering in accordance with the present invention.

Referring to FIG. 3, a system 12 in accordance with the present invention may operate in any suitable manner to support customization of an autonomous driving experience. For example, a system 12 may be embodied as hardware, software, or some combination thereof.

In selected embodiments, a system 12 may include computer hardware and computer software. The computer hardware of a system 12 may include one or more processors 22, memory 24, one or more user interfaces 26, other hardware 28, or the like or a combination or sub-combination thereof. In certain embodiments, all or some subset of this computer hardware may be hardware already included as part of a vehicle 10. That is, all or some portion of the computer hardware may be multipurpose and perform tasks that are already associated with the operation of the vehicle 10. Alternatively, a system 12 in accordance with the present invention may be dedicated exclusively to enabling, supporting, and/or providing object-oriented, multi-dimensional audio rendering.

The memory 24 of a system 12 in accordance with the present invention may be operably connected to the one or more processors 22 and store the computer software. This may enable the one or more processors 22 to execute the computer software. Thus, a system 12 may augment the functionality or features of a vehicle 10 by adding and/or modifying software, adding additional hardware to the vehicle 10, or a combination thereof.

A user interface 26 of a system 12 may enable an engineer, technician, occupant (e.g., driver), or the like to interact with, run, customize, or control various aspects of a system 12. A user interface 26 may enable a user to manually control (e.g., select, type in, incrementally increase or decrease at the touch of a button or twist of a knob) and/or orally control (e.g., issue one or more commands or requests using his or her voice) one or more settings in order to customize a driving experience to meet his or her specific needs. In selected embodiments, a user interface 26 of a system 12 may include one or more buttons, switches, knobs, keypads, keyboards, touch screens, pointing devices, microphones, speakers, or video speakers, the like or a combination or sub-combination thereof. Alternatively, or in addition thereto, a user interface 26 may comprise one or more communication ports (e.g., plug in ports, wireless communication ports, etc.) through which one or more external computers or devices may communicate with a system 12 or one or more components thereof.

In selected embodiments, the memory 24 of a system 12 may store (at least temporality) sensor data 30. Such sensor data 30 may be or include one or more files or segments of data output by one or more sensors 14 carried on-board a vehicle 10. The memory 24 may also store one or more sound files 32. A sound file 32 may comprise digital audio data corresponding to a particular sound or sound profile. Accordingly, when a system 12 "plays" a sound file 32, the particular sound or sound profile corresponding thereto may emanate from one or more of the speakers 16 of the vehicle 10.

Additionally, the memory 24 may store one or more software modules. For example, the memory 24 may store a communication module 34, sound module 36, other data or software 38, or the like or a combination or sub-combinations thereof. Alternatively, one or more of the communication module 34 and the sound module 36 may be embodied as hardware or comprise hardware components. Thus, while FIG. 3 shows the communication module 34 and the sound module 36 as being software-only modules that are stored in memory 24, in certain embodiments, one or more of these modules 34, 36 may comprise hardware, software, or a combination thereof.

A communication module 34 may enable data such as one or more sound files 32, software components (e.g., a sound module 36 or updates thereto), or the like or combinations of sub-combinations thereof to be passed into or out of a system 12 in accordance with the present invention. For example, a communication module 34 forming part of a system 12 carried on-board a vehicle 10 may enable that system 12 to transfer (e.g., wireless upload) sensor data 30 collected by the system 12. Alternatively, or in addition thereto, a communication module 34 may enable a system 12 to receive an update to its sound module 36. Accordingly, improvements developed off-board a vehicle 10 may be brought on-board as desired or necessary.

Figure 5:
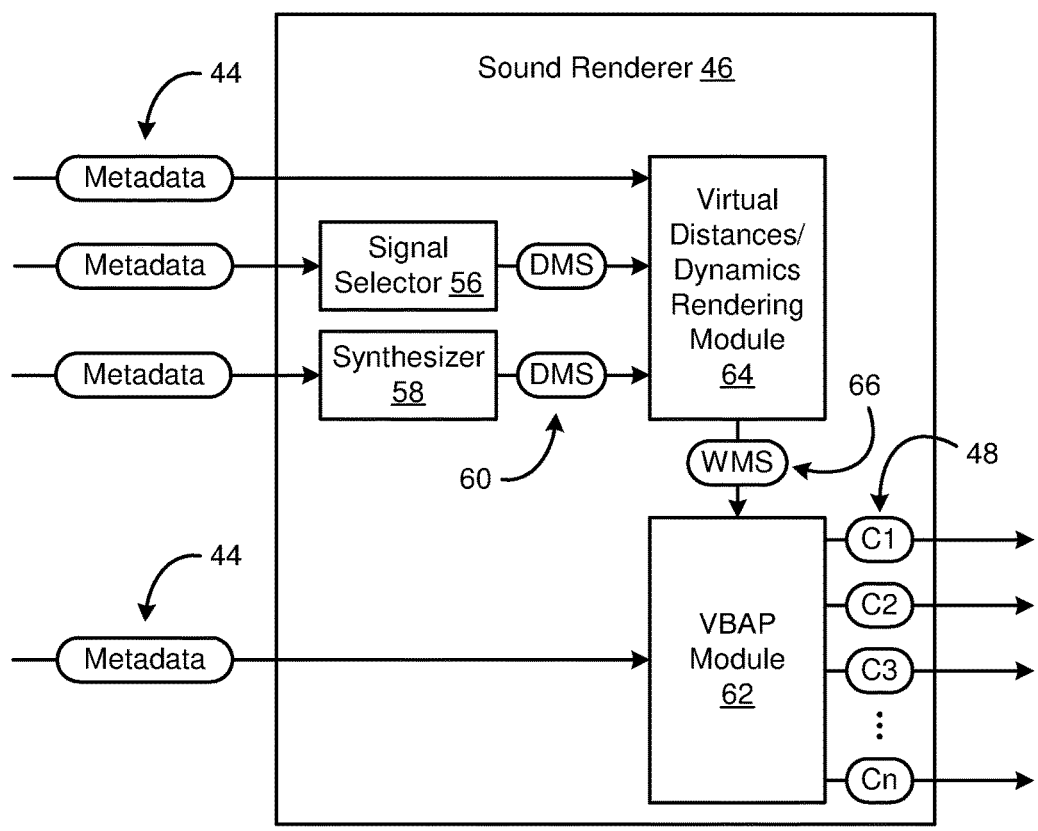
FIG. 5 is a schematic block diagram illustrating one embodiment of a sound renderer module and/or function that may form part of a sound module in accordance with the present invention.
Figure 6:
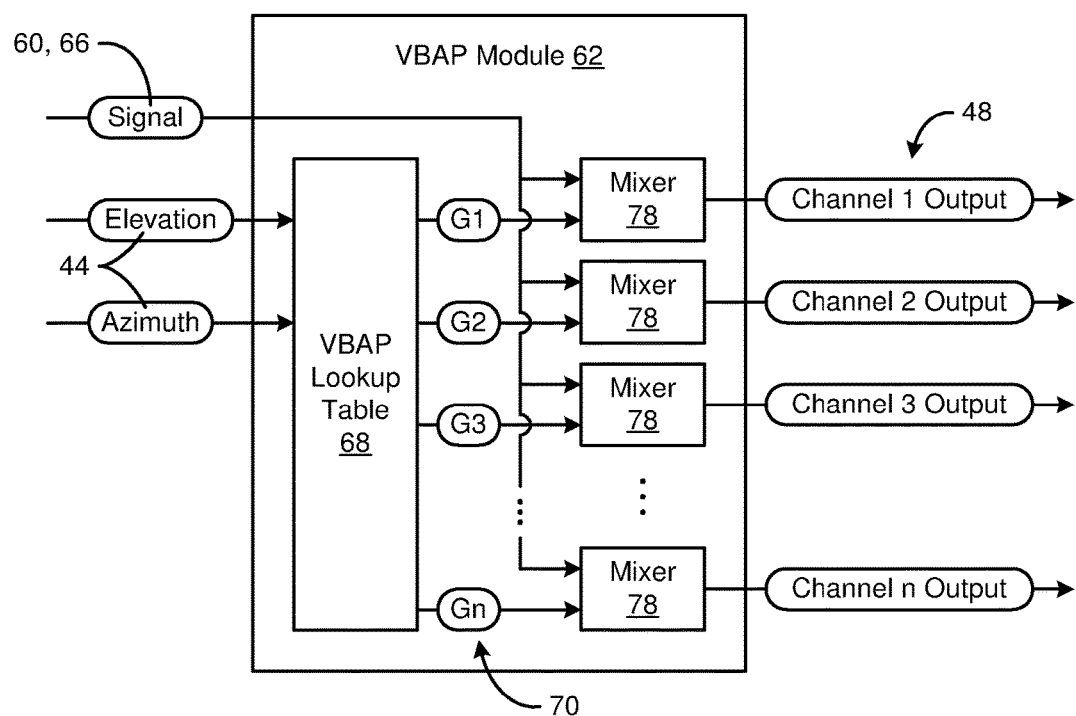
FIG. 6 is a schematic block diagram illustrating one embodiment of a VBAP module and/or function that may form part of a sound module in accordance with the present invention.

A sound module 36 may control and/or generate selected audio signal that is delivered to and transduced by one or more speakers 16 of a vehicle 10. In selected embodiments, this may include monitoring CAN signals (e.g., signals transmitted on the Controller Area Network (CAN) bus of the vehicle 10), generating sound objects, rendering one or more output channels, mixing multiple output channels, amplifying one or more output channels, or the like or combinations or sub-combinations thereof as illustrated in FIGS. 4-6 and described hereafter.

Figure 4:
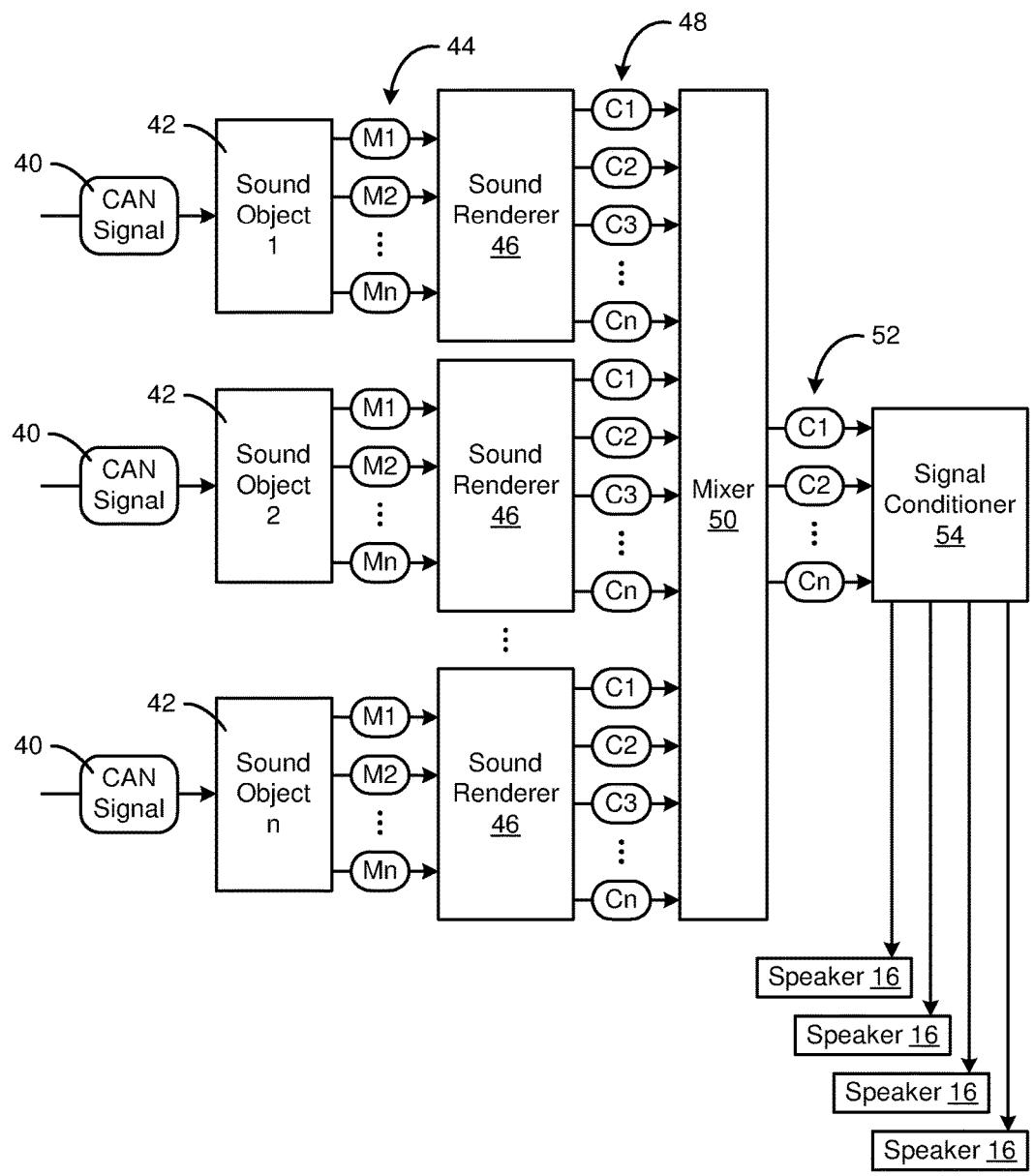
FIG. 4 is a schematic block diagram illustrating a high level view of one embodiment of the sub-modules and/or functions of a sound module in accordance with the present invention.

Referring to FIG. 4, in selected embodiments, signal 40 corresponding to one or more sensors 14 may travel on a CAN bus. Accordingly, by monitoring a CAN bus, a sound module 36 in accordance with the present invention may detect a condition programmatically assigned an audio alert. For example, a sound module 36 may monitor a CAN bus to detect when an audio alert corresponding to a "door ajar" condition, "seatbelt unlatched" condition, or the like should be issued.

Additionally, by monitoring a CAN bus, a sound module 36 may learn location information that may be used in generating an audio alert (e.g., information that may be used to select a virtual source for an audio alert). For example, a signal 40 on a CAN bus may reveal that a rear, passenger-side door is ajar. Accordingly, a sound module 36 may generate an audio alert that will seem, from the perspective of a driver 18 or other occupant of the vehicle 10, to originate proximate the rear, passenger-side door. Thus, the audio alert may simultaneously communicate the presence of the condition and the location of the condition.

In certain embodiments, a sound module 36 may generate one or more sound objects 42. Different sound objects 42 may correspond to different signals 40 on a CAN bus. Thus, different sound objects 42 may correspond to different conditions that are programmatically assigned audio alerts.

A sound object 42 may be a collection of data to assist or direct subsequent efforts of a sound module 36 to generate an appropriate sound. The data may define one or more parameters governing the generation of sound for the object 42 and may be defined by methods that take as inputs signals derived from sensors 14 and/or other vehicular signals 40 and output metadata 44 values according to predefined functions.

For example, metadata 44 may include a sound volume selected according to a size or proximity of an obstacle detected behind a vehicle 10 (e.g., wherein the volume increases with size and/or proximity). Other metadata 44 may indicate whether the sound corresponding to the sound object 42 should be modeled as a plane wave, point source, or the like. In certain embodiments, a sound object 42 may comprise data identifying a type of sound (e.g., a particular sound file 32) that should be played, an azimuth for a virtual source of the sound, an elevation for a virtual source of the sound, or the like or a combination or sub-combination thereof.

In selected embodiments, a sound module 36 may comprise one or more sound renderers 46 or perform one or more sound-rendering functions. Each such renderer 46 or rendering function may produce one or more initial channel outputs 48. Each such initial channel output 48 may correspond to a different speaker 16. Accordingly, the number of initial channels outputs 48 for a particular sound object 42 may correspond to the number of speakers 16.

A sound module 36 may comprise one or more mixers 50 or perform one or more mixing functions. For example, a mixer 50 may mix multiple initial channel outputs 48 corresponding to a first speaker 16a to produce a final channel output 52 for the first speaker 16a, mix multiple initial channel outputs 48 corresponding to a second speaker 16b to produce a final channel output 52 for that second speaker 16b, and so forth. Thus, each final channel output 52 may correspond to a different speaker 16. Accordingly, the number of final channels outputs 52 may correspond to the number of speakers 16.

In certain embodiments, a sound module 36 may comprise one or more signal conditioners 54 or perform one or more conditioning functions. For example, a signal conditioner 54 may perform an digital to analog conversion, amplify one or more signals, or the like or a combination or sub-combination thereof. Thus, a sound module 36 may prepare audio signal that may be delivered to and transduced by one or more speakers 16 of a vehicle 10.

Referring to FIG. 5, in selected embodiments, a sounder renderer 46 or sound rendering function may use metadata 44 to select an audio signal or control or direct a signal selector 56. Alternatively, or in addition thereto, a sounder renderer 46 or sound rendering function may use metadata 44 to synthesize an audio signal or control or direct a signal synthesizer 58. Such selection and/or synthesizing or corresponding components 56, 58 may result in or produce an audio signal 60 (e.g., a dry mono source signal 60).

In certain embodiments, the resulting audio signal 60 may be fed directly into a vector base amplitude panning (VBAP) module 62 or function. Alternatively, the resulting audio signal 60 may be fed to a different module 64 or function for enhancement. For example, the resulting audio signal 60 may be fed to a module 64 or function that applies one or more virtual distances (e.g., taking into account the speed of sound and how far it will need to travel to reach an intended target 18, 20 for each of the various speakers 16) and/or dynamics rendering (e.g., applying Doppler, reverb, sound envelope, or correlation effects, or the like or a combination or sub-combination thereof) to the audio signal 60 to produce an enhanced audio signal 66 (e.g., wet mono source signal 66).

Figure 7:
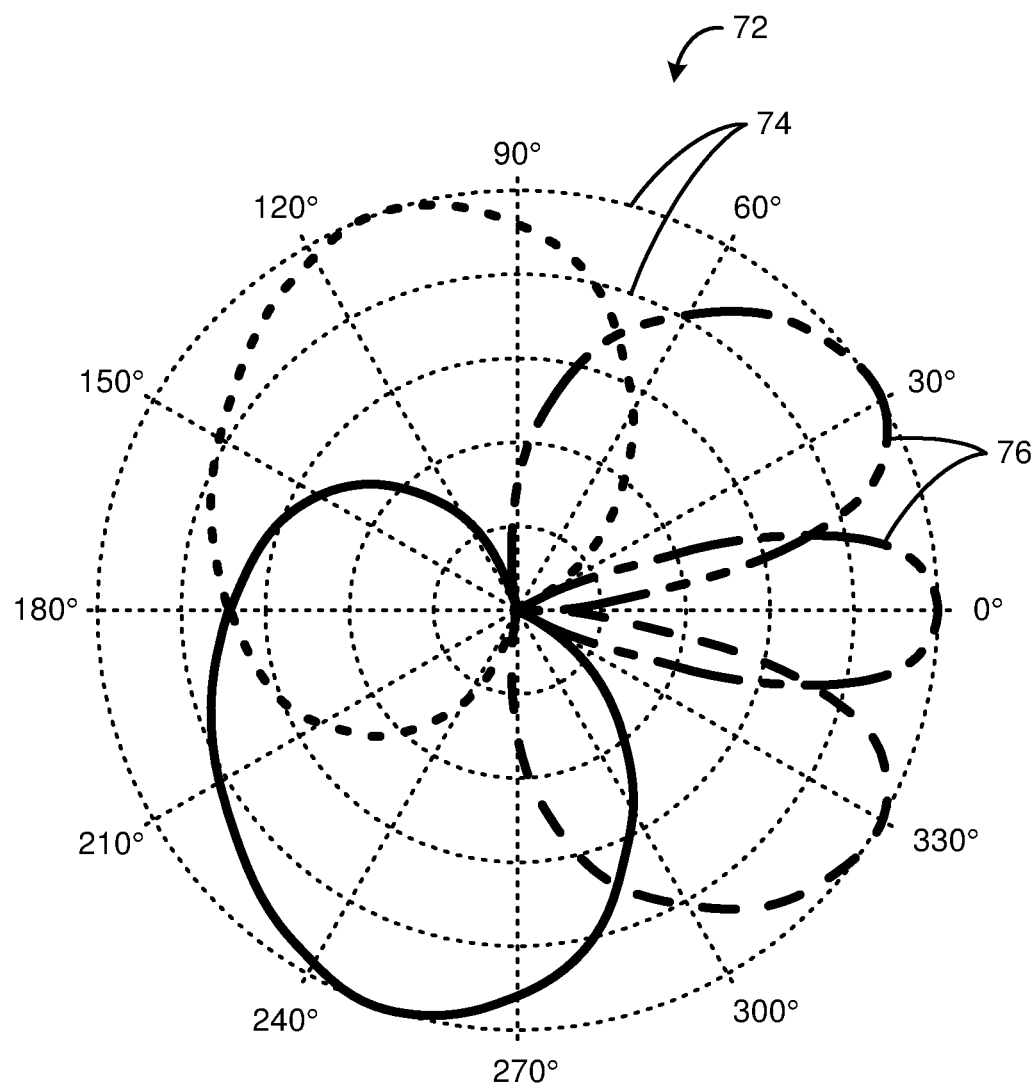
FIG. 7 is a graphical illustration of a two dimensional solution set of one or more VBAP equations corresponding to a particular vehicular configuration.

Referring to FIGS. 6 and 7, in certain embodiments, a VBAP module 62 or function may receive an audio signal 60, 66 and data (e.g., metadata 44) defining a virtual source for the audio signal. The virtual source may define a direction from which the sound corresponding to the audio signal 60, 66 is to be perceived by a driver 18, person proximate a center point 20, or other target or the like. In selected embodiments, the data defining a virtual source may be an azimuth or an azimuth in combination with an elevation.

In certain embodiments, a VBAP module 62 may comprise a VBAP lookup table 68. In selected embodiments, a VBAP lookup table 68 may be or comprise a tabular solution set of one or more vector-base-amplitude-panning equations calculated using known locations of a plurality of speakers 16 within a vehicle 10 with respect to one or more known (e.g., selected) target points 18, 20 within the vehicle 10. Accordingly, a VBAP module 62 may store more than one VBAP lookup table 68 or an expanded table covering more than one target point 18, 20. For example, a first lookup table 68 may correspond to a target located where the head of a driver 18 is expected to be. A second lookup table 68 may correspond to a target located at a center 20 of a vehicle 10 or some other location therewithin.

"Inputs" for a VBAP lookup table 68 may be an azimuth angle in two-dimensional embodiments and azimuth and elevation angles in three-dimensional embodiments. In selected embodiments, inputs may also include the desired target location (e.g., in order to select an appropriate VBAP table 68 or portion thereof). "Outputs" for a VBAP lookup table 68 may be gain values 70 comprising one gain value 70 for each of the plurality of speakers 16 within the vehicle 10 (i.e., for each of the speakers 16 whose location was known and used to produce the solution set). A graphical example 72 of such a solution set in two-dimensions is provided in FIG. 7.

In the graphical example 72, the vehicle 10 at issue includes five speakers 16, the target for the sound is a center point 20 (e.g., a point that is at least laterally centered in the vehicle 10), and a 0° azimuth corresponds to a forward direction within the vehicle 10. A first speaker 16 (e.g., a forward speaker 16a) is located at about a 0° azimuth with respect to the center point 20, a second speaker 16 (e.g., a left-side speaker 16b) is located at about a 30° azimuth with respect to the center point 20, a third speaker 16 (e.g., a right-side speaker 16c) is located at about a 330° azimuth with respect to the center point 20, a fourth speaker 16 (e.g., a left-rear speaker 16d) is located at about an 110° azimuth with respect to the center point 20, and a fifth speaker 16 (e.g., a rear-right speaker 16e) is located at about a 250° azimuth with respect to the center point 20.

The concentric circles 74 provided in the graphical example 72 represent gain values 70. The outermost concentric circle 74 represents a gain value 70 of 1.0. The next concentric circle 74 represents a gain value 70 of 0.8. The next concentric circle 74 represents a gain value 70 of 0.6 and so forth. The center of the concentric circles 74 represents a gain value 70 of 0.0. The various lobes 76 each represent gain values 70 correlated to azimuth angles for a particular speaker 16. Since this example 72 corresponds to five speakers 16, there are five lobes 76.

To read the graphical example 72, one may select an azimuth corresponding to a desired virtual source. The appropriate gain values 70 for one or more speakers 16 may then correspond to the location where the corresponding lobe 76 crosses the selected azimuth. For example, to produce a virtual source at an azimuth of 180°, the fourth speaker 16 (e.g., the left-rear speaker 16d) and the fifth speaker 16 (e.g., the rear-right speaker 16e) may each have a gain value 70 of about 0.7. The gain for the first, second, and third speakers 16 may be about 0.0. To produce a virtual source at an azimuth of 150°, the fourth speaker 16 (e.g., the left-rear speaker 16d) may have a gain value 70 of about 0.83 and the fifth speaker 16 (e.g., the rear-right speaker 16e) may have a gain value 70 of about 0.55. Again, the gain for the first, second, and third speakers 16 may be about 0.0. In this manner, the gain values 70 for each speaker 16 may be determined for any azimuth.

In a graphical example corresponding to full three-dimensional space, the concentric circles 74 may become concentric spheres and the lobes 76 may become three-dimensional lobe surfaces. However, in selected embodiments, the effective height or depth limit (e.g., elevation limit in the positive or negative direction) for a virtual source may be the corresponding height or depth of the adjacent speakers 16. Thus, elevation changes or options for a virtual source may correspond to or fall within the elevation span of the adjacent speakers 16 (e.g., the vertical distance between adjacent speakers 16). As a result, the greater the elevation span of the adjacent speakers 16, the greater the elevation options for a virtual source.

In selected embodiments, when an azimuth angle, elevation angle, desired target location, or the like or a combination or sub-combination thereof are applied to or "input" into a VBAP lookup table 68, a plurality of gain values 70 may be obtained or "output." In selected situations (e.g., situations corresponding to a particular set of inputs), one gain value 70 may be non-zero and the rest may be zero. In other situations, two gain values 70 may be non-zero and the rest may be zero. In still other situations, three gain values 70 may be non-zero and the rest may be zero. In certain embodiments, three may be the maximum number of non-zero gain values 70 output by a VBAP lookup table 68.

In selected embodiments, a VBAP module 62 or function may include one or more mixers 78. Such mixers 78 may mix or apply different gain values 70 with or to the audio signal 60, 66 to obtain a channel output (e.g., an initial channel output 48) for a corresponding speaker 16. Thus, the gain value 70 corresponding to a first speaker 16a may be mixed with or applied to the signal 60, 66 to obtain a channel output correspond to the first speaker 16a, the gain value 70 corresponding to a second speaker 16b may be mixed with or applied to the signal 60, 66 to obtain a channel output correspond to the second speaker 16b, and so forth.

In this manner, the virtual source may be encoded within the signal 60, 66. Accordingly, when the speakers 16 project their respective channel outputs (e.g., final channel outputs 52), the person or people located near the selected target 18, 20 may perceive the corresponding sounds as originating in the direction of the virtual source.

Figure 8:
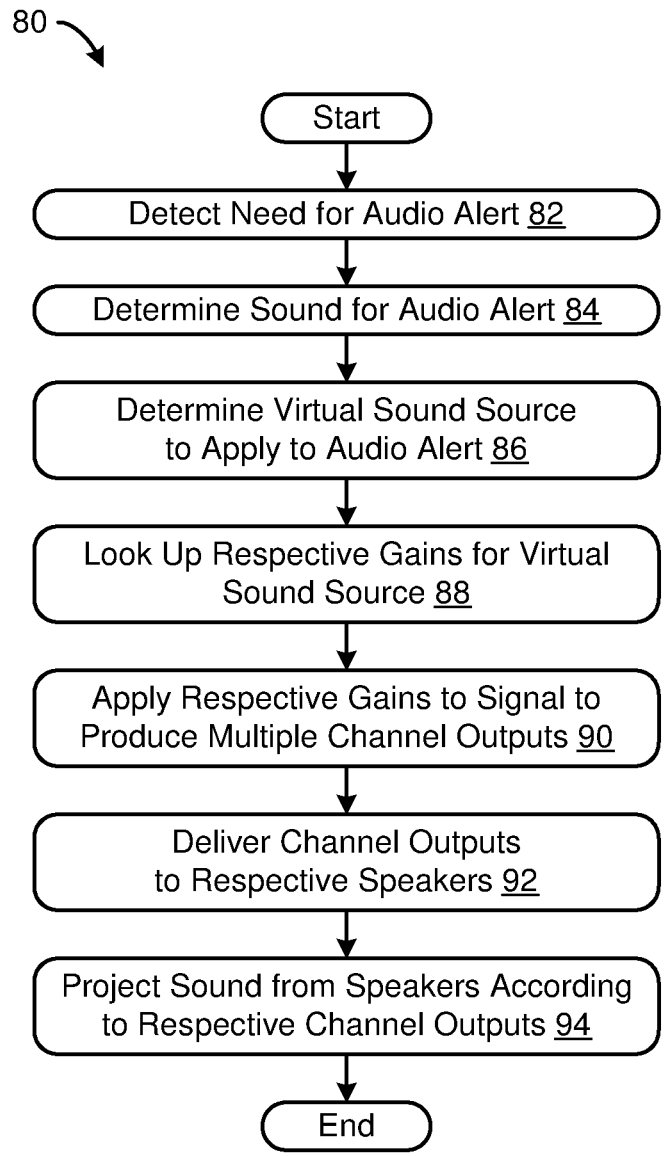
FIG. 8 is a schematic block diagram of one embodiment of a method for multi-dimensional audio rendering in accordance with the present invention.

Referring to FIG. 8, in selected embodiments, a method 80 performed or executed by a sound module 36 may include detecting 82 a need for an audio alert. In certain embodiments, this may involve monitoring a CAN bus for one or more signals 40 indicative of one or more conditions for which one or more audio alert are desired. Thus, a sound module 36 may be programmed to detect 82 certain signals 40 (e.g., CAN signals 40). A sound module 36 may also be programmed to respond to such detecting 82 with particular actions.

For example, a sound module 36 may respond to such detecting 82 by determining 84 a sound or sound profile that will form the basis of the audio alert. This may include selecting, obtaining, and/or synthesizing an audio signal (e.g., a sound file 32). A sound module 36 may also respond by determining 86 a virtual source to apply to the sound or sound profile. Accordingly, a sound module 36 may lookup 88 within a VBAP lookup table 68 respective gain values 70 that may enable, support, or provide the virtual source.

Once the gain values 70 are known, a sound module 36 may apply 90 the respective gain values 70 to the audio signal to produce multiple channel outputs. These channel outputs may then be delivered 92 to corresponding speakers 16. According, when the sound or sound profile is projected 94 from the speakers 16 as dictated in the respective channel outputs, one or more persons within the vehicle 10 may perceive the sound or sound profile as having originated from the direction of the virtual source.

In view of the foregoing, a sound module 36 may simultaneously communicate multiple pieces of information to one or more persons within a vehicle 10. Such pieces of information may include the existence of a condition that merits human attention and a respective direction toward that condition. In that a sound and direction to a source of the sound can be perceived very rapidly, a sound module 36 in accordance with the present invention may provide communication between a vehicle 10 and one or more occupants thereof that is of a higher bandwidth and/or speed than otherwise available.

The flowchart in FIG. 8 illustrates the architecture, functionality, and operation of possible implementations of systems, methods, and computer-program products according to various embodiments in accordance with the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A method comprising:
   detecting, by a computer system onboard a vehicle, an output of an internal sensor detecting a state of a component of the vehicle, the output being assigned an audio alert and a virtual source for the audio alert corresponding to a location of the component in the vehicle;
   determining, by the computer system based on the virtual source, a gain value for each speaker of a plurality of speakers carried in fix positions onboard the vehicle; and
   projecting, by each speaker of the plurality of speakers, the audio alert according to the gain value determined therefor.

2. The method of claim 1, wherein the plurality of speakers are noncollinear and comprise at least three speakers spaced from one another.

3. The method of claim 2, wherein the plurality of speakers comprises less than all of a total allotment of speakers carried onboard the vehicle.

4. The method of claim 2, wherein the virtual source comprises an azimuth and an elevation corresponding to a point located within the vehicle.

5. The method of claim 4, wherein the three speakers are closest, among the total allotment of speakers, to the virtual source from the perspective of the point.

6. The method of claim 5, wherein the point corresponds to at least one of (a) a location of a head of a driver of the vehicle and (b) to a center of a cabin of the vehicle.

7. The method of claim 1, further comprising storing, by the computer system, a lookup table correlating a plurality of azimuths, a plurality of elevations, and a plurality of gain values for each speaker of the total allotment of speakers;
   wherein the lookup table comprises calculated solutions to one or more vector-base-amplitude-panning (VBAP) equations, wherein respective azimuth and elevations values for each speaker of the total allotment of speakers is known with respect to the point.

8. The method of claim 7, wherein the determining comprises using, by the computer system, the azimuth and elevation corresponding to the virtual source to identity within the lookup table the gain value for each of the total allotment of speakers.

9. The method of claim 8, wherein the identifying within the lookup table the gain value for each of the total allotment of speakers comprises identifying a non-zero gain value for each of the three speakers.

10. The method of claim 9, wherein the identifying within the lookup table the gain value for each of the total allotment of speakers comprises identifying a zero gain value for all speakers within the total allotment of speakers that are not one of the three speakers.

11. A method comprising:
    storing, within memory of a computer system carried onboard a vehicle, a lookup table comprising calculated solutions to one or more vector-base-amplitude-panning (VBAP) equations based on known locations of a plurality of speakers within the vehicle with respect to a point within the vehicle;
    detecting, by a computer system onboard a vehicle, a condition programmatically assigned an audio alert and a virtual source for the audio alert, wherein the virtual source comprises at least one of an azimuth and an elevation with respect to the point;
    identifying, by the computer system within the lookup table, a gain value for each speaker of the plurality of speakers dictated by the at least one of the azimuth and the elevation; and
    projecting, by each speaker of the plurality of speakers, the audio alert according to the gain value determined therefor.

12. The method of claim 11, the plurality of speakers comprises more than three speakers.

13. The method of claim 12, wherein the point is a location of a head of a driver of the vehicle or a center of a cabin of the vehicle.

14. The method of claim 13, wherein the identifying within the lookup table the gain value for each speaker of the plurality of speakers comprises identifying a non-zero gain value for each of three speakers.

15. The method of claim 14, wherein the identifying within the lookup table the gain value for each speaker of the plurality of speakers comprises identifying a zero gain value for all speakers within the plurality of speakers that are not one of the three speakers.

16. The method of claim 15, wherein the three speakers are closest, among the plurality of speakers, to the virtual source from the perspective of the point.

17. A system comprising:
    a vehicle;
    a plurality of speakers carried onboard the vehicle;
    a computer system carried onboard the vehicle, the computer system comprising at least one processor and memory operably connected to the at least one processor, the memory storing a lookup table comprising calculated solutions to one or more vector-base-amplitude-panning (VBAP) equations based on known locations of a plurality of speakers within the vehicle with respect to a point within the vehicle; and
    the computer system wherein the memory further stores software programmed to
       detect a condition programmatically assigned an audio alert and a virtual source for the audio alert, wherein the virtual source comprises at least one of an azimuth and an elevation with respect to a point within the vehicle,
       identify, within the lookup table, a gain value for each speaker of the plurality of speakers dictated by the at least one of the azimuth and the elevation, and
       play the audio alert through each speaker of the plurality of speakers according to the gain value identified therefor.

18. The method of claim 1, wherein:
    detecting, by the computer system, the output of the internal sensor detecting the state of the component comprises detecting an output of a door ajar sensor for a door of the vehicle;
    wherein determining, by the computer system based on the virtual source for the output of the door ajar sensor, the gain value for each speaker of the plurality of speakers carried in fix positions onboard the vehicle comprises determining the gain value for each speaker such that the audio alert sounds as if from a location of the door of the vehicle.

19. The method of claim 1, wherein:
detecting, by the computer system, the output of the internal sensor detecting the state of the component comprises detecting an output of a seat belt sensor for a seat belt of the vehicle;
wherein determining, by the computer system based on the virtual source for the output of the door ajar sensor, the gain value for each speaker of the plurality of speakers carried in fix positions onboard the vehicle comprises determining the gain value for each speaker such that the audio alert sounds as if from a location of the seat belt of the vehicle.

20. The method of claim 1, further comprising, receiving, by the computer system, the output of the internal sensor from a controller area network (CAN) bus of the vehicle.

* * * * *